W. H. & J. A. FROMAN.
Vehicle-Shaft Holder.

No. 196,888. Patented Nov. 6, 1877.

Attest:
E. E. Court.
August Petersohn.

Inventors:
William H. & John A. Froman,
by Louis Bagger & Co.
Attys.

UNITED STATES PATENT OFFICE.

WILLIAM H. FROMAN AND JOHN A. FROMAN, OF ELIZABETHTOWN, KY.

IMPROVEMENT IN VEHICLE SHAFT-HOLDERS.

Specification forming part of Letters Patent No. 196,888, dated November 6, 1877; application filed August 13, 1877.

*To all whom it may concern:*

Be it known that we, WILLIAM H. FROMAN and JOHN A. FROMAN, of Elizabethtown, in the county of Hardin and State of Kentucky, have invented certain new and useful Improvements in Shaft-Holders for Vehicles; and we do hereby declare that the following is a full, clear, and exact description thereof, which will enable others skilled in the art to which it appertains to make and use the same, reference being had to the accompanying drawings, which form a part of this specification, and in which—

Figure 1:
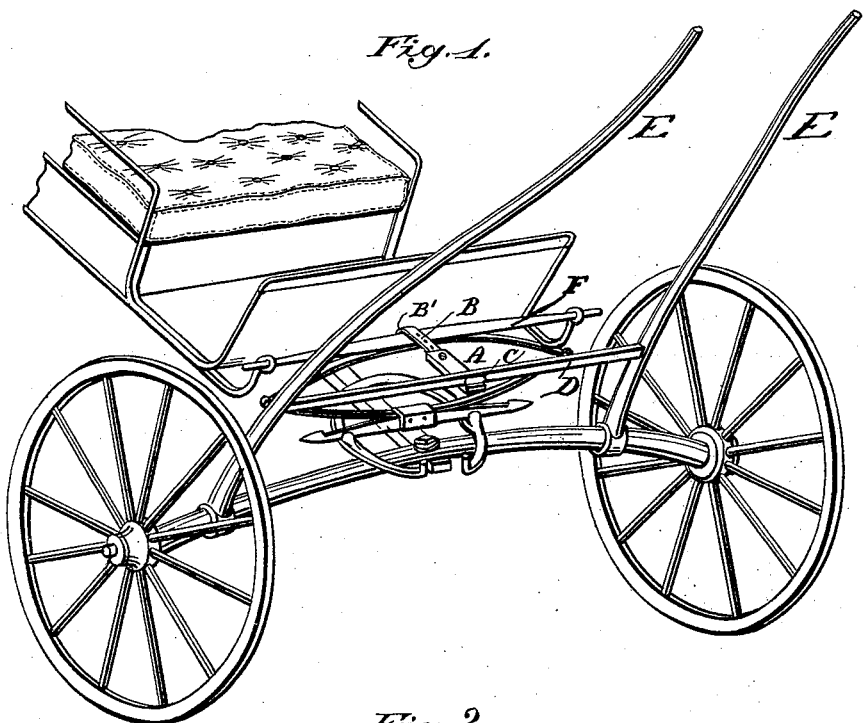
Figure 2:
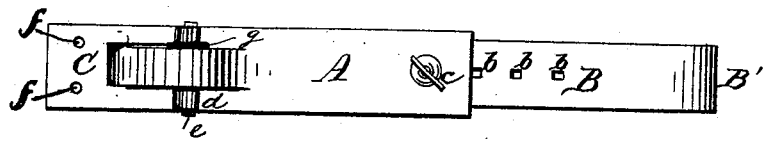
Figure 3:
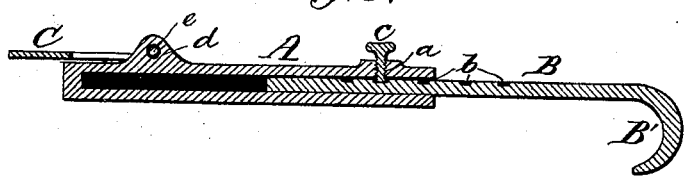

Figure 1 is a perspective view, showing the application of our invention. Fig. 2 is a top plan of the shaft-holder detached, and Fig. 3 is a longitudinal section.

Similar letters of reference indicate corresponding parts in all the figures.

Our invention relates to devices for holding up the shafts of buggies and other vehicles when not in use, or when the horse is detached; and it consists in the construction and arrangement of a holder which shall always, of itself, occupy a position ready for hooking, so as not to require previous adjustment, substantially as hereinafter more fully described, and pointed out in the claim.

In the drawing, A is a socket-piece, made of malleable iron, into which fits the shank B of a hook, B'. Shank B has a series of depressions or perforations, (denoted by $b$,) and the socket-piece A is perforated on the top, as shown at $a$, a set-screw, $c$, working in the perforation, and fitting into the depressions $b$, so that the shank may readily be adjusted within the socket, letting the hook project a greater or shorter distance, as circumstances may require.

On the rear part of the socket-piece A is formed a bearing, $d$, through which passes the pin $e$ of the hinge-plate C. The latter has holes $ff$, by which it may be secured to the under side of the cross-bar D by the aid of screws. A rubber washer, $g$, is inserted on the pin next to the bearing, to prevent rattling of the hinge when the vehicle is in motion.

The use of this device will be readily understood by reference to Fig. 1. The hinge C is screwed to the under side of the cross-bar D between the shafts E E, with the hook B' pointing downward and against the vehicle. When the horse has been detached, the shafts are lifted up until hook B' takes with the front spring-bar F, in which position the hook will keep the shafts in their elevated or raised position, as shown on the drawing.

It will be observed that by this construction of the socket-piece A with its hinge C, the hook will, when the device is secured upon the cross-piece, project straight out, capable of being raised up, so as to take with the spring-bar, but not of falling down, so that it will always be ready for coupling.

Having thus described our invention, we claim and desire to secure by Letters Patent of the United States—

As an improvement in shaft-holders, the combination of the hinge C with the socket-piece A, having adjustable hook B B', the said socket-piece projecting back of the hinging-point $c$, substantially as and for the purpose herein shown and described.

In testimony that we claim the foregoing as our own we have hereto affixed our signatures in presence of two witnesses.

WILLIAM HENRY FROMAN.
JOHN ALEXANDER FROMAN.

Witnesses:
O. DAVIS,
INYON WRIGHT.